United States Patent Office 2,873,356
Patented Feb. 10, 1959

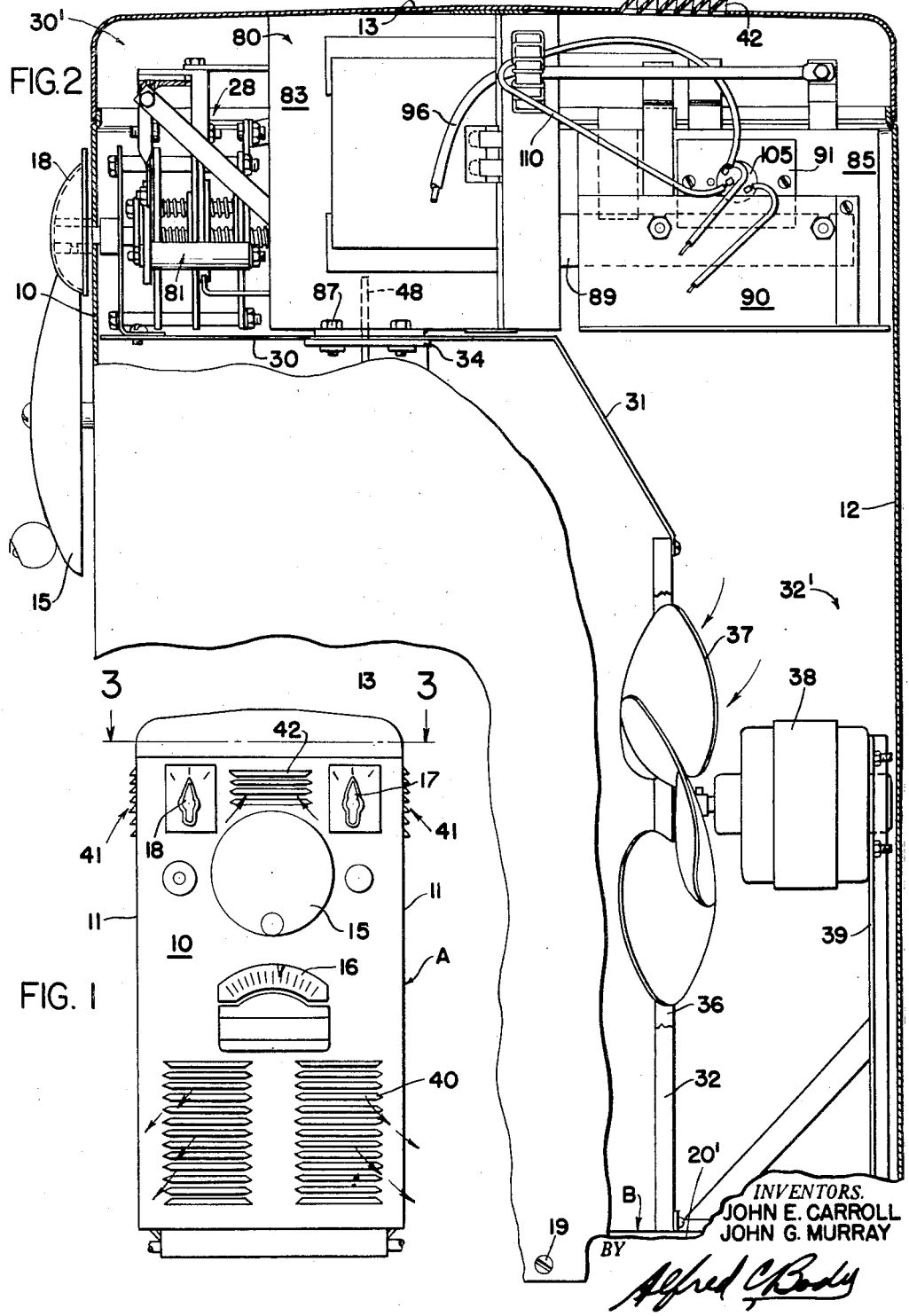

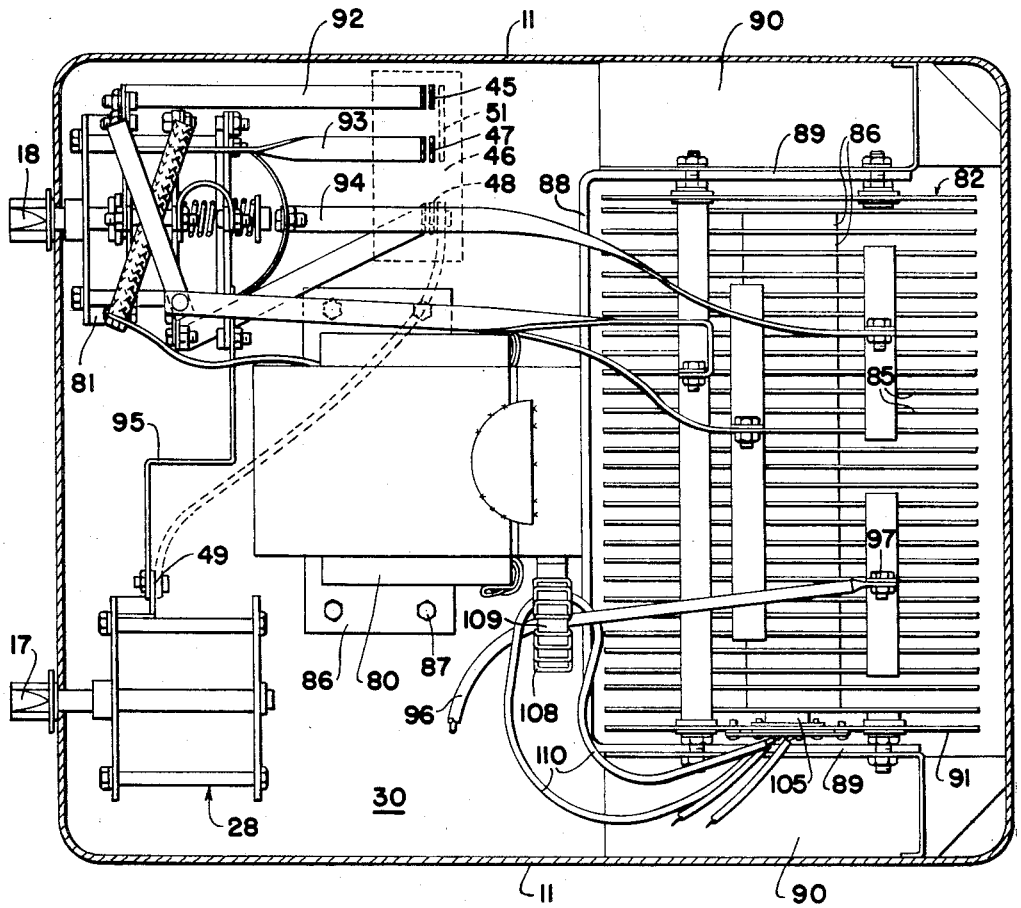
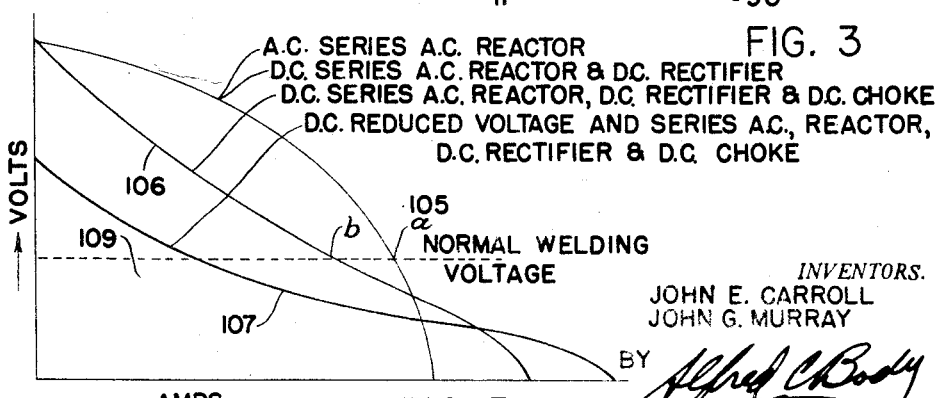
FIG. 5
INVENTORS.
JOHN E. CARROLL
JOHN G. MURRAY
BY Alfred C. Body
ATTORNEY

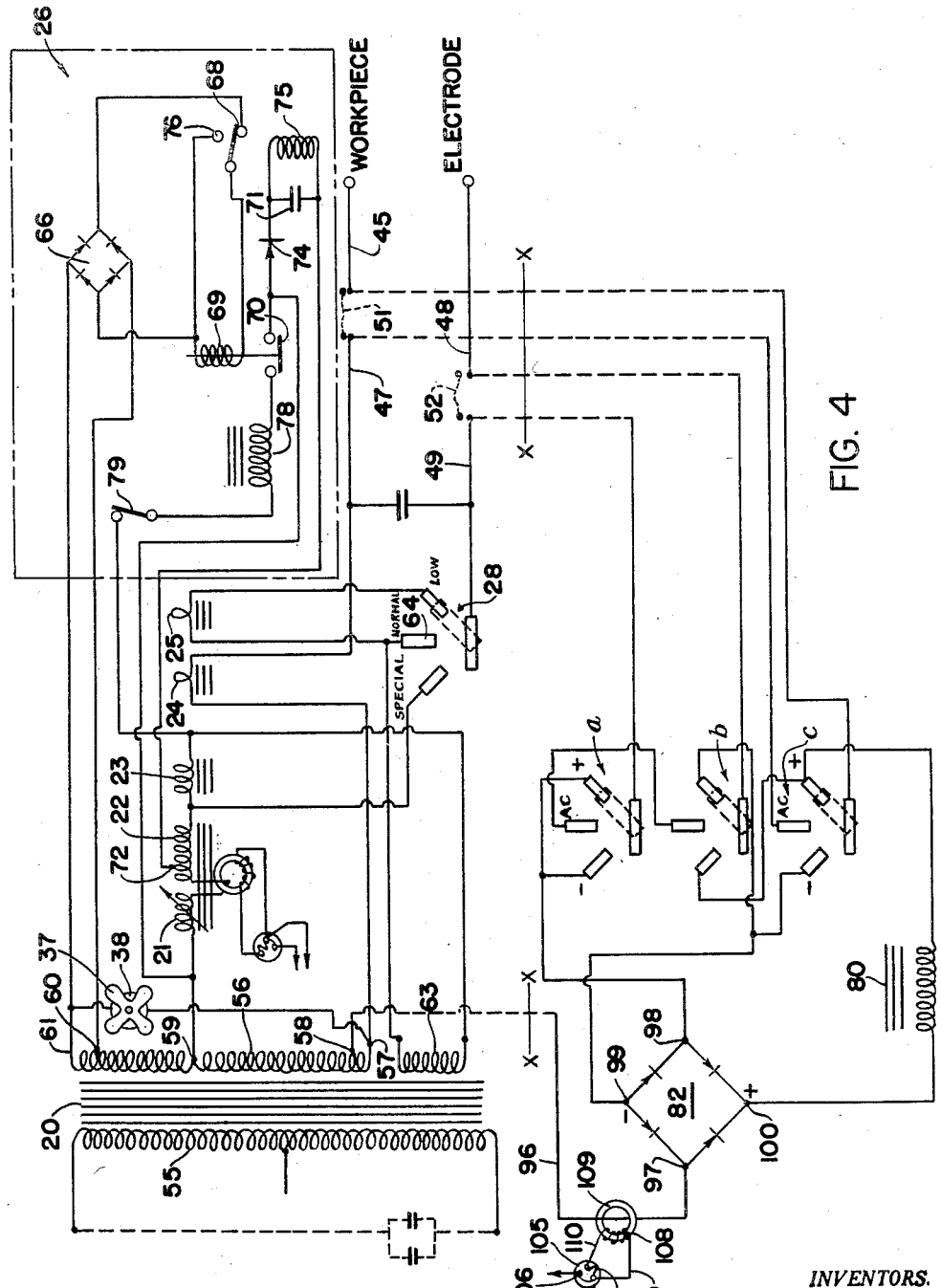

2,873,356

ELECTRIC ARC WELDING POWER SUPPLY

John E. Carroll, South Euclid, and John G. Murray, Willoughby, Ohio

Application October 17, 1955, Serial No. 540,975

9 Claims. (Cl. 219—131)

This invention pertains to the art of electric arc welding and more particularly to new and improved apparatus for supplying electric arc welding power.

The principal object of the present invention is the provision of a new and improved power source for electric arc welding which is simple in construction and circuitry, durable and effective in operation.

Another object of the invention is the provision of a new and improved power source for supplying electric arc welding currents which may be sold initially as an alternating current power source and may be readily converted to supply, selectively, alternating or direct current for welding purposes.

Another object of the invention is the provision of a new and improved electric arc welding power source which may be originally sold as an alternating current power source and readily converted to a selectively direct or alternating current power source with the arrangement being such that when the means for converting to direct current are added, the cooling air for the A. C. power source will also cool the direct current apparatus such as the rectifier choke.

Still another object of the invention is the provision of a new and improved D. C. electric arc welding power source having improved volt-ampere characteristics.

Still another object of the invention is the provision of a new and improved direct current electric arc welding power source including in combination a single phase high reactance type A. C. power source, a full wave rectifier connected across such source, and a choke in series with the output of such rectifier to provide a D. C. power source having a high ratio of short circuit current to welding current.

Still another object of the invention is the provision of an apparatus of the type referred to having a disc type rectifier having improved safety features against momentary high overloads.

In accordance with the present invention, there is provided alternating current power supply apparatus for electric arc welding comprising: in combination, a housing and the usual alternating current supply equipment, all positioned in such housing as to leave a space at one end and with jumper terminals extending into the space, together with direct current conversion means including a rectifier and controls for shifting from either A. C. or D. C. output, such conversion means being arranged as to be positionable in said space either at the time of original manufacture or later and having terminals connectable with the other terminals when the jumpers are removed.

Further, in accordance with the invention, a power circuit is provided comprised of a single phase alternating current power source having substantial series reactance, a full wave rectifier connected across this source and an inductive reactance in series with the rectifier output, the result being, contrary to normal expectations and the usual drooping or downwardly concave volt-ampere curve of a high reactance single phase A. C. power source, a flattening or upwardly concave volt ampere curve at the welding voltage whereby improved welding characteristics result in the range from the normal arc voltage to zero.

Still further in accordance with the invention a protective arrangement for dry disc type rectifiers is provided comprising in combination a dry disc type rectifier, a thermostat operated switch in thermo-conductive relationship with such rectifier and having a heater element energized proportionately to the current flowing through such rectifier whereby the thermostat will function either normally to de-energize the rectifier due to actual heating of the rectifier to dangerous temperatures, or when a current flows through the rectifier of a value which would cause damage before the heat generated thereby can be conducted to the thermostat.

The invention may take physical form in certain parts and arrangements of parts, a preferred embodiment of which will be described in detail in this specification and illustrated in the accompanying drawing, which is a part hereof and wherein:

Figure 1 is a front elevational view of electric arc welding apparatus embodying the present invention.

Figure 2 is a fragmentary side elevational view with portions of the housing broken away to show the arrangement of parts in the interior, the scale of Figure 2 being greatly enlarged over that of Figure 1.

Figure 3 is a top section view of Figure 1 taken approximately on the line 3—3 thereof, the scale being the same as that of Figure 2.

Figure 4 is a schematic wiring diagram of the welding apparatus; and,

Figure 5 is a graph of typical volt-ampere curves obtainable with the present invention.

Referring now to the drawings wherein the showings are for the purposes of illustrating a preferred embodiment of the invention only and not for the purpose of limiting same, Figure 1 shows a housing A for the arc welding apparatus comprised generally of a front 10, sides 11, a back 12, and a top 13.

Mounted on or extending through the front panel 10 is a current control knob 15, an indicating scale 16 coupled with the control knob 15, an arc control knob 17 mounted on a switch having three positions, namely special, normal and low heat, and a polarity control knob 18 having three positions, namely electrode positive, electrode negative and A. C. It will be noted that the knobs 17, 18 are positioned at the upper part of the housing A.

The housing A may be formed of sheet metal or the like, and may be formed to the general shape shown by stamping or other known methods.

The housing A in the preferred embodiment is not a structural member, as such, of the apparatus shown and generally slips over the apparatus shown and to be described, and is fastened to an inner frame B by screws 19. Such frame B is comprised generally of a base 20 on which is mounted all apparatus, with a single exception, conventional to alternating current welders including a step-down transformer 20 (see Figure 4), various reactors 21, 22, 23, 24, 25 and controls indicated generally at 26 primarily active in starting the arc and controlling the power to the electrode.

This apparatus is all mounted generally toward the front of the base 20 and has a height somewhat less than the overall height of the housing A.

The single exception referred to above is the arc control switch, indicated generally at 28 and actuated by the knob 17, which as shown in Figures 1 and 2, is positioned in the upper right hand part of the housing A. This switch may be positioned at any convenient location. It is convenient where shown.

The switch 28, the specific construction of which forms no part of the present invention, is mounted on the upper surface of a baffle extending horizontally as at 30 from the front panel 10 toward the rear, then downwardly at an angle as at 31, and then vertically as at 32 to the base 20. It will be noted that the horizontal portion of the baffle 30 is spaced substantially from the top 13 of the housing.

The baffles 30, 31 and 32 all extend the full width of the housing A, for reasons as will appear. These baffles divide the housing into two compartments, the forward and lower one containing the alternating current portion of the apparatus. The other compartment is in effect in two portions, namely a vertical portion 32' and a horizontal upper portion 30'.

The transformer assembly has a bracket 34 at the upper edge thereof which has bolt openings which align with bolt openings in the baffle 30. Thus mechanically solid means extends from the base 20 to the baffle 30. A lifting eye not shown may, if desired, be fastened to the bracket so that the entire apparatus may be picked up by a hook crane or the like. Further, as will appear later, the D. C. conversion apparatus may also be fastened to the bracket 34.

The vertical baffle 32 has a central or circular opening 36 in which a fan blade 37 rotates. The fan blade is mounted on the output shaft of an electric motor 38, in turn mounted on bracket 39 mounted on the base 20. The pitch of the fan 37 and its direction of rotation is such as to blow air from right to left, as viewed in Figure 2. That is to say, the fan 37 blows air directly on to the alternating current apparatus including the transformer 20 and the various reactors above referred to.

The lower part of the front panel 10 has a plurality of louvres 40 through which the air from the fan 37 may escape from the housing A.

The portions of the side panels 11 above the horizontal baffle 30 and the front panel 10 between the knobs 17, 18 are provided with louvres 41, 42 respectively through which air is sucked into the housing by means of the fan 37. The louvres 41 are located at the forward part of the side panels 11. Louvres 42 are also provided at the top rear.

It will thus be seen that the fan 37 sucks air into the forward upper part of the housing A, then draws it to the rear of the housing A downwardly to the fan and then forwardly across the transformer and out through the front of the housing through the louvres 40.

The path of the air flow is important in relation to the D. C. conversion unit for the A. C. welder presently to be described.

Four electrical terminals are provided and made accessible above the baffle 30. Thus one terminal 45 in the form of a copper strap extends through an opening in a sheet of insulation 46 downwardly to a "work" power connection stud (not shown) mounted on one of the sides 11. Another terminal 47 extends downwardly through the insulating member 46 and connected to one or more of the reactors, as will presently appear.

A third terminal 48 extends downwardly through the insulating member 46 and connected to the "electrode" power connection stud (not shown) located on the side of the housing A and adjacent to the "work" power connection stud.

A fourth terminal 49 is found on the switch 28 which, as before described, is located in the upper right hand part of the housing A.

When the apparatus shown is sold as an alternating current welder only, a jumper shown by dotted lines at 51, is connected between terminals 45, 47 and a jumper shown by dotted lines at 52 is connected between the terminals 48 and 49.

If the machine is to be converted to an A. C.-D. C. power source, these jumpers 51, 52 are removed and connections made to the terminals 45, 47, 48 and 49 as will appear.

The electrical circuit for the alternating current welding apparatus just described is shown in Figure 4 above the line X—X. Obviously other equivalent circuits could be employed. Thus the apparatus shown is comprised of a single phase transformer 20 having a primary 55 arranged for any desired single phase input voltage such as 220 or 440 volts and a tapped secondary 56 having terminals 57, 58, 59, 60 and 61. The fan driving motor 38 is connected between the terminals 61 and 57. The terminal 57 is connected through reactor 24, to the terminal 57, the jumper 51 and the terminal 45 to the "workpiece" connecting terminal.

The switch 28 is of the 3-position type, having "low," "normal" and "special" positions. When in the "normal" position, the electrode is energized from terminal 59 through reactors 21, 22, 23 and auxiliary secondary winding 63, the "normal" switch contact 64, the terminal 49 and jumper 52, and the terminal 48 to the electrode.

With the switch 28 in the "low" position, the reactor 25 is placed in series with the electrode welding circuit.

With the switch 28 in the "special" position, the reactors 23, 24 and the supplementary secondary winding 63 are eliminated from the circuit.

The secondary terminals 60, 61 connect to the A. C. terminals of a full wave D. C. rectifier 66, the output terminals of which connect through the normally closed contacts 68 of a pilot relay 75 to the energizing coil of a delayed opening relay 69. Thus when the transformer 20 is energized, the relay 69 is energized and its contacts 70 are closed.

When a welding operation is started, the electrode is touched to the workpiece which causes a current to flow through the reactors 21 and 22. This causes an A. C. voltage differential to appear between the tap 72 on the reactor 22, and the secondary terminal 59. This voltage appears across a half wave germanium rectifier 74 and the energizing coil of pilot relay 75 in parallel with a condenser 71. Energization of this relay opens the contact 68 and closes the contact 76. This de-energizes the relay 69 which opens the contact 70 after a short time interval. When the contacts are closed, a reactor 78 is in parallel with the reactor 21 and the tap 72 on the reactor resulting in a lower reactance. Thus a high initial surge of welding current results to assist in the starting of the arc. After the predetermined time interval, however, the reactor 78 is removed from the circuit by the opening of contact 70, thus increasing the effective reactance of the circuit and lowering the welding current to a predetermined value. This gives an "arc boosting" action to assist in starting the arc. It forms no part of the present inventions. Oviously it may be omitted or equivalents substituted.

A switch 79 is provided to disable this "arc boosting" action.

It will be noted that at all times, and particularly after the reactor 78 is removed from the circuit, that there is a substantial reactance in series with the output of the transformer 20. Such an arrangement provides a downwardly concave or drooping volt ampere curve generally as indicated at 105 in Figure 5. The provision of this series reactance is an important part of one aspect of the present invention and its effect will be brought out hereinafter.

It is to be specifically noted that the invention is not limited to the use of a separate reactor coil in series with the transformer secondary. This series reactance may be provided in a number of different ways, such as by introducing a high leakage reactance into the transformer 20 itself, by spacing the secondary relative to the primary, by providing an adjustable core which is moved into and out of the windings, by adjusting the air gap in the core, or providing a core saturation by a separately produced direct current magnetic field.

In the event it is desired to convert the apparatus thus described, to be able to supply direct current for welding purposes, the arrangement is such that this can easily be effected. Thus a direct current conversion unit is provided consisting of a reactor or choke coil 80, having a multiturn winding and a core 83, a polarity conversion switch 81 and a full wave rectifier 82 of the dry type, either selenium, copper oxide or the equivalent.

Such rectifiers as is known generally comprise a plurality of rectangularly shaped plates 85 in spaced relationship and having metallic washers 86 positioned therebetween. These washers 86 and the adjacent surfaces of the plate 85 are appropriately treated to provide a rectifying action on the electric current. The exposed surfaces of the plates 85 dissipate the heat generated in the rectifier by the currents flowing therethrough.

In the embodiment of the invention shown, the choke 80, the switch 81 and the rectifier 82 are all so mounted as to be received in the upper part of the housing A with the rectifier toward the rear, that is, in the intersection of the horizontal and vertical compartment portions 30', 32' respectively. The choke is generally centrally located and the switch 81 is in the upper left hand part of the housing A. Rectifier 82 is mounted on the choke 80 which, in turn, is fastened to the bracket 34. The rectifier 82 and choke 80 are installed as a unit.

Thus, the choke 80 is comprised generally of a base flange 86 having openings therethrough to align with the openings in the horizontal baffle 30 and the openings in the transformer bracket 34, above described. Bolts 87 fasten the choke 80 to the bracket 34. The choke 80 is centrally located over the center of gravity of the alternating current apparatus in the lower part of the housing A. An eyelet not shown may be provided on the top of this choke for the purpose of lifting either the unit into place on the baffle 30 or after the choke 80 is bolted in place, for lifting the entire welding apparatus by a hook crane.

A U-shaped bracket is mounted on the back of the choke 80 and the rectifier 82 is mounted between the legs 89 of this bracket.

In the embodiment of the invention shown, the rectifier stack is of a length less than the width of the housing A. Thus baffle members 90 are mounted on each end of the rectifier stack of a width to extend to the sides 11 of the housing A. Obviously if the rectifier stack 82 were longer, such as would be the case with higher capacity welders, the baffles 90 could be eliminated. Also the rear edge of the baffle 30 is spaced from the back 12 a distance slightly greater than the fore and aft dimensions of the plates 85.

The purpose of the baffles 90 and the spacing of the rear edge of the baffle 30 from back 12 is to cause all of the cooling air sucked in the louvres 41, 42 by the fan 37 to pass through and over the entire width of the plates 85 of the rectifier 82. A cooling action thus results and it will be noted that no changes in the cooling need be made in order to convert the apparatus from A. C. to D. C. by positioning the D. C. conversion apparatus in the housing. The air entering through louvres 42 strikes the rectifier 85 directly. Air entering the louvres 41 cools both the choke 80 and the rectifier 85.

The switch 81 is a 3-gang, 3-position switch and enables the electrode to be made either D. C. negative or D. C. positive, or to have A. C. supplied thereto.

To facilitate the conversion from A. C. to D. C., the conversion unit and, in this case, the switch 81 has mechanically self-supporting preformed leads made from copper straps leading therefrom to a position to make electrical engagement with the terminals 45, 47, 48 and 49. Thus a lead 92 mounted on one of the terminals of the switch 81 connects to the terminal 45. In a like manner straps 93, 94 and 95 connect to the terminals 47, 48 and 49 respectively.

In the embodiment of the invention shown, the voltage across the secondary 56 is slightly more than can safely be applied to the rectifier stack 82. Thus a special lead 96 is run from the terminal 48 to the terminal 97 on the rectifier stack. Obviously, if the rectifier were able to safely withstand the desired A. C. welding voltage, the terminal 56 could be eliminated and the terminal 97 connected directly to the terminal 47.

The other A. C. terminal 98 of the rectifier stack 82, when the switch 81 is in either the positive or negative position, is connected through gang "a" to the terminal 49.

The negative terminal 99 of the rectifier connected through the gangs "b" or "c" to either the workpiece or electrode terminals 45 or 48, as will be apparent.

The positive terminal 100 of the rectifier stack 82 connects through the iron cored reactor or choke 80 to contacts in the gangs "b" and "c" so as to be selectively connected to either the "workpiece" or the "electrode" terminal studs.

When the gangs "a," "b," and "c" are in the mid position, it will be noted that the rectifier stack 82 is disconnected and the electric terminal 48 and workpiece terminal 45 are connected directly through the switch 82 to the wires 47, 49.

The combination of the choke 80 and a single phase A. C. power source having a high series reactance, form an important part of the present invention.

As previously pointed out, this high series reactance may be provided in a number of different manners. The preferred embodiment employs the reactors 21, 22, 23 and 24, the cooperation of the choke 80 and the high series reactance will be described as though such reactors were employed. Obviously the invention is not so limited.

The operation may best be described by referring to a volt-ampere diagram such as is shown in Figure 5. Curve 105 shows a typical volt-ampere curve for the A. C. portion of the welder when the series reactance are in series with the output of the welding transformer 20.

A typical arc voltage for proper welding is indicated at 109. Curve 105 is also typical if the D. C. rectifier 82 were employed without the choke 80.

Curve 106 is typical of a slightly reduced A. C. reactance but with the choke 80 in series with the output of the rectifier 82. The A. C. reactance is reduced slightly to raise the voltage at higher loads.

Curve 107 is similar at 106 with the exception that a reduced A. C. voltage is applied to the rectifier by switching out some of the turns, namely the winding 63 forming part of the secondary circuit, and also eliminating more of the reactance of the A. C. power circuit.

The superior welding obtainable using the present invention, that is, by welding using a volt ampere curve such as curve 106 or 107, may be explained generally as follows: In welding, droplets of metal continually move from the welding electrode to the workpiece. Some droplets are larger than others and occasionally one will be large enough to actually form a continuous circuit of molten metal from the electrode end to the molten weld pool. When this happens a short circuit condition exists.

If it be assumed that the welder is welding at point "a" on the curve 105, when this short circuiting occurs, it will be seen from the curve that the voltage drops to substantially zero while the current rises but little. The arc goes out and the molten metal freezes and the electrode sticks to the workpiece.

If it be assumed, however, that the welder is welding using the curve 106 at the point "b" thereon, it will be noted that the voltage tends to drop to zero but at the same time there is a very substantial rise in the welding current, such rise being sufficient to vaporize the molten drop before the arc path becomes deionized and the arc goes out. Instead the arc is immediately re-established and the welding continues without difficulty.

Thus the present invention provides a volt-ampere curve having a much higher ratio of short circuit current to load current than has ever heretofore been available in welding apparatus of the type to which this invention pertains.

The invention is of particular importance in view of the present tendency to employ what is called "touch" or "drag" welding wherein the electrode end is allowed to touch the workpiece continuously during the welding and is dragged sidewardly along the desired line of the weld seam. With such welding, the tendency for the molten bead to short out the electrode to the molten weld pool is more prevalent than heretofore. The shape of the volt ampere curve at the welding voltage which provides the higher ratio of short circuit current to load current prevents this tendency.

On the other hand, it should be pointed out that an excessive ratio of short circuit current to the normal welding current is not always desirable because such excessive short circuit currents will cause spatter.

It is to be noted that the present invention is limited to single phase A. C. and a full wave rectifier arrangement for such single phase A. C. power.

Experiments have shown that the larger the inductive value of the choke 80, the more dished or concave upwardly the volt-ampere curve will become. The maximum amount of inductance is primarily limited by practical problems because as the inductance goes up, due to increased number of turns in the winding of the choke, the resistance of the winding likewise goes up thus introducing undesirable losses in a high current circuit. Thus the inductive value of the choke 80 may be chosen to provide the desired shape of volt ampere curve.

In the preferred embodiment of the invention the inductance of the choke 80 is made automatically variable in inverse proportion to the welding current. This effect is accomplished by so adjusting the area and air gap of the choke core and the number of turns in the winding that as the welding current increases beyond the normal welding range, the inductance will decrease effectively to almost zero and the welding curve at the high current values becomes concave downwardly, as is shown in the figures.

While it is impossible to state with any definite limitations as to the exact inductance required, the choke employed on a 300 to 400 ampere welder had an inductance of .58 millihenry as measured on an inductance bridge, a calculated maximum inductance of 1.4 millihenries at the lower values of current and an inductance of a few microhenries at the maximum welding current.

For welders of from 300 to 500 ampere current range, a choke having a core area of 17½ square inches, 25 turns, and an air gap of ¼" has been found to be satisfactory.

For a 200 ampere welder, the same core was employed with 30 turns and a 3/32" air gap.

In the use of the dry rectifiers in D. C. welders, one problem which has always existed has been the heating of the rectifier stack to damaging temperatures by short heavy overloads before any heat-sensitive devices associated with the rectifier can take proper action. These heavy overloads heat the rectifying surfaces faster than the heat can be conducted away where the heat sensitive protective devices must be located.

The present invention contemplates an arrangement whereby it is practically impossible to damage the rectifier stack either by sustained moderate overloads or by short heavy overloads, such as would result in the latter case from direct short circuits such as would result from the electrode freezing to the workpiece. The invention provides a combined heat sensitive and current sensitive device mounted on the rectifier for this purpose.

Thus, in the embodiment of the invention shown, a thermostat 105 having a heat actuated switch 106 is mounted directly on the guard plate 91 on the end of the rectifier stack and against one of the rectifier plates 85 which thermostat will open its contacts 106 whenever the plates 85 become heated due to moderate prolonged overloads.

The thermostat 105 is also provided with an auxiliary heater 107 connected through leads 110 to the secondary 108 of a current transformer 109 coupled to the lead 96 between the secondary tap 58 and the rectifier input terminal 97.

The purpose of the heater element 107 is to heat the thermostat 105 rapidly in the event of high overload currents and accelerate the opening of the contacts 106. However, for currents at or below the rating of the rectifier stack 82, the heater element 107 is relatively ineffective. Note that the heating effect of the heater 107 increases with the square of the welding current.

The contacts 106 connect to and control the energization of the main line starter, not shown, for the welder above described. It will thus be seen that the rectifier 82 is provided with means sensitive to both the actual temperature of the rectifier plates 85 and simultaneously sensitive to the rectifier currents and thus to high overloads. The means will de-energize the welder in the event of a damaging condition such as high currents which would damage the rectifier elements before the heat can be conducted to the thermostat.

The invention has been described with reference to a preferred embodiment. Obviously modifications and alterations to the preferred embodiment described will occur to others upon a reading and understanding of this specification, and it is our intention to include all such modifications and alterations insofar as they come within the scope of the appended claims.

Having thus described our invention, we claim:

1. Electric arc welding apparatus comprising in combination a housing, a base, alternating current power supply apparatus on said base and including a transformer and reactors positioned in the lower front portion of said housing, a baffle over the top and rear of said power source and spaced from the top and rear of said housing providing a compartment having intersecting horizontal and vertical portions, ventilating louvres in the lower front of said housing, and in the upper part of said housing above said top baffle, fan means in the vertical portion of said baffle, and a dry disc type rectifier at the intersecting portion of said vertical and horizontal portions.

2. Electric arc welding apparatus comprising in combination a housing, a base, alternating current power source on said base positioned in the lower front of said housing, and including a transformer and reactors, a horizontal and vertical extending baffle over the top and rear of said power source spaced from the top and rear of said housing and providing a compartment having intersecting vertical and horizontal portions, a pair of terminals extending upwardly through the horizontal baffle and adapted to be jumpered when said apparatus is adapted to supply only alternating welding current, and a D. C. conversion unit for said apparatus comprised of a choke and a dry disc type rectifier, and having a pair of terminals adapted to match with the terminals extending through the baffle, said choke being centrally located in said housing, said dry disc type rectifier being positioned at the intersection of said vertical and horizontal portions, ventilating louvres in said housing both above and below said horizontal baffle and a ventilating fan in the vertical baffle.

3. Electric arc welding apparatus comprising in combination a housing, a base, alternating current power source on said base positioned in the lower front of said housing, and including a transformer and reactors, a horizontal and vertical extending baffle over the top and rear of said power source spaced from the top and rear of said housing and providing a compartment having intersecting vertical and horizontal portions, a pair of terminals extending upwardly through the horizontal baffle and adapted to be jumpered when said apparatus is adapted to supply only alternating welding current, and a D. C. conversion unit for said apparatus comprised of a choke and a dry disc type rectifier, and a pair of terminals adapted to match with the terminals extending through the baffle, said choke being centrally located in said housing, said dry disc type rectifier being positioned at the intersection of said vertical and horizontal portions, ventilating louvres in said housing both above and below said horizontal baffle and a ventilating fan in the vertical baffle, mechanically solid means extending from said base to the underside of said horizontal baffle and fastening means extending from said choke to said means through said baffle.

4. An electric arc welding apparatus to be sold as an alternating current power source for electric welding but convertible to either D. C. or A. C. welding apparatus with a minimum of changes, comprising in combination a housing, a base, alternating current power source on the base including a transformer and reactors positioned in the lower front of said housing, a horizontally and vertically extending baffle over the top and rear respectively of said power source, and spaced from the top and rear of said housing, providing a compartment having intersecting vertical and horizontal portions, louvres in said housing above said horizontal baffle, louvres in said housing below said horizontal baffle and forward of said vertical baffle, a ventilating fan in the vertical baffle, terminals from said alternating current power source extending through the horizontal baffle and adapted to be jumpered or connected to a D. C. conversion unit, mechanically solid means extending from the base to the underside of the baffle.

5. The combination of claim 4 wherein a D. C. conversion unit is provided comprised of a choke, a dry disc type rectifier and an electrode voltage selector switch, said choke being so positioned as to align with said solid means and adapted to be fastened thereto, said rectifier being located relative to said choke so as to be positioned at the intersecting portion of said vertical and horizontal portions, and terminals extending to match with the terminals extending through the horizontal baffle and adapted to be connected thereto.

6. Electric arc welding apparatus, comprising, in combination: a single phase A. C. power source, having means for providing an effective high series reactance, a full wave rectifier connected across said source, and a reactor connected in series with the D. C. output of said rectifier to provide a high ratio of short circuit current to welding current and having an inductance which varies in inverse proportion to the current.

7. The combination of claim 6 wherein said reactor is an iron cored choke having the turns, iron core cross-sectional area and air gap, all so inter-related that its inductive reactance falls off substantially at the maximum current ratings of the apparatus.

8. An electric arc welding apparatus to be sold as an alternating current power source for electric welding, but convertible to either D. C. or A. C. welding apparatus with a minimum of changes, comprising in combination a housing including a base and a removable outer wall, an alternating current power source in said housing, including a transformer, reactance means and blower means for cooling said transformer, all positioned within said housing remote from said removable outer wall to provide a void of substantial size adjacent said removable outer wall, a workpiece terminal and an electrode terminal mounted on said housing and a power lead leading from each of said electrode and workpiece terminals and from said transformer into said void, removable jumpers in said void between said power leads, an inlet air opening and an exhaust air opening through said housing, one of said openings communicating with said void, baffles in said housing whereby said blower means moves cooling air through said void and over said transformer.

9. The combination of claim 8 wherein said jumper means are removed and an A. C.-D. C. conversion unit is positioned in said void, said unit comprising at least a rectifier and switching means mechanically connected together as a unit, power leads to said switching means and said rectifier connected to said transformer and said terminal power leads.

References Cited in the file of this patent

UNITED STATES PATENTS

| | | |
|---|---|---|
| Re. 22,609 | Steinert | Feb. 27, 1945 |
| 1,723,584 | Shoemaker | Aug. 6, 1929 |
| 1,924,906 | Bower | Aug. 29, 1933 |
| 1,959,513 | Weyandt | May 22, 1934 |
| 1,994,953 | Klinkhamer | Mar. 19, 1935 |
| 2,068,883 | Klinkhamer | Jan. 26, 1937 |
| 2,077,114 | Klinkhamer | Apr. 13, 1937 |
| 2,171,512 | Crout | Aug. 29, 1939 |
| 2,305,380 | Edwards | Dec. 15, 1942 |
| 2,357,418 | Mattheyses | Sept. 5, 1944 |
| 2,597,689 | Welch | May 20, 1952 |
| 2,757,296 | Bichsel | July 31, 1956 |